United States Patent
Hartley et al.

(10) Patent No.: US 11,212,683 B1
(45) Date of Patent: Dec. 28, 2021

(54) METHOD FOR PRIORITIZED CONNECTION OF A MULTI-CORE CHIPSET TO EXTERNAL ACCESS POINTS AND VEHICLE USING THE SAME

(71) Applicant: GM GLOBAL TECHNOLOGY OPERATIONS LLC, Detroit, MI (US)

(72) Inventors: Steven Hartley, Pointe-Claire (CA); Lakshmi V. Thanayankizil, Rochester Hills, MI (US); Bhargavi Chandrakumar, Clinton Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 17/000,591

(22) Filed: Aug. 24, 2020

(51) Int. Cl.
*H04W 84/12* (2009.01)
*H04W 16/14* (2009.01)
*H04W 88/06* (2009.01)
*H04W 48/16* (2009.01)
*H04W 48/20* (2009.01)

(52) U.S. Cl.
CPC .......... *H04W 16/14* (2013.01); *H04W 48/16* (2013.01); *H04W 48/20* (2013.01); *H04W 84/12* (2013.01); *H04W 88/06* (2013.01)

(58) Field of Classification Search
CPC .......................... H04W 88/02; G06K 7/10891
USPC .................. 455/446, 436, 444; 370/331
See application file for complete search history.

(56) References Cited

U.S. PATENT DOCUMENTS

| 2005/0138178 | A1* | 6/2005 | Astarabadi | ........ | H04W 36/0085 |
| | | | | | 709/227 |
| 2011/0032913 | A1* | 2/2011 | Patil | ........ | H04W 72/08 |
| | | | | | 370/338 |
| 2017/0208539 | A1* | 7/2017 | Brisebois | ........ | H04W 16/32 |

* cited by examiner

*Primary Examiner* — Kiet M Doan
(74) *Attorney, Agent, or Firm* — Quinn IP Law

(57) ABSTRACT

A method for use aboard a motor vehicle or other mobile system having a multi-core communication chipset includes scanning a radio frequency spectrum to identify candidate access points (APs) operating in a frequency band of the communication chipset, e.g., 2.4 GHz and 5 GHz. The method includes selecting one of the candidate APs as a first AP for connection to a primary station of the chipset. In response to a secondary station (STA-2) of the chipset being connected to an external AP on the same frequency band as the first AP, the method includes automatically disconnecting the secondary station (STA-2), then connecting the first AP to the primary station. Another candidate AP is connected to the secondary station as a second AP. The method may include simultaneously communicating with the first and second APs via the primary and secondary stations, respectively.

20 Claims, 2 Drawing Sheets

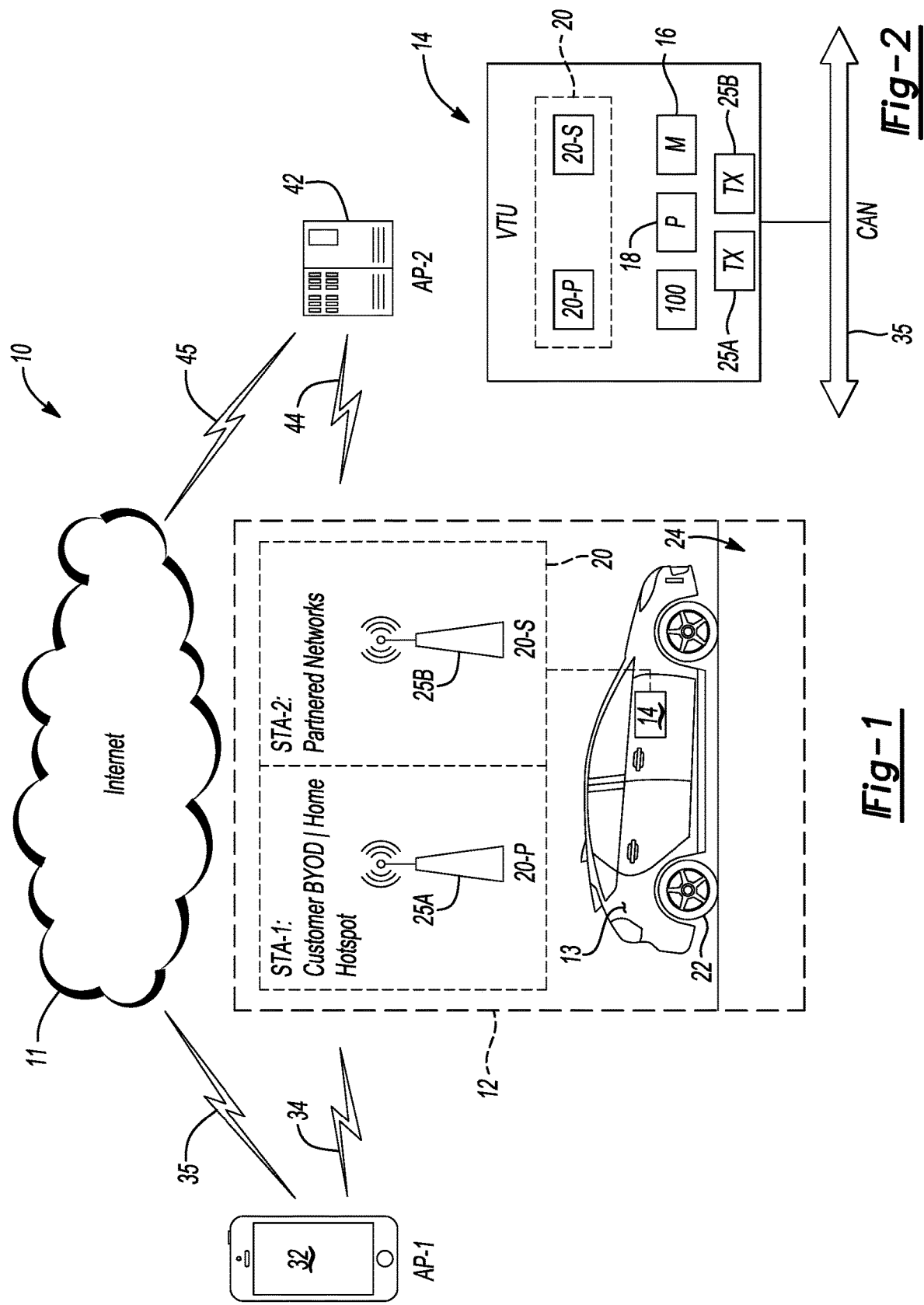

METHOD FOR PRIORITIZED CONNECTION OF A MULTI-CORE CHIPSET TO EXTERNAL ACCESS POINTS AND VEHICLE USING THE SAME

INTRODUCTION

In a wireless communication network, a compatible device such as a cellular phone or a desktop, tablet, or laptop computer is able to connect to the internet via a wireless access point (AP). An AP acts as a transceiver node for transmitting and receiving data respectively to or from a coupled client device, with the client device generally referred to in the art as a "station". In order to communicate wirelessly with an AP, a given station is equipped with a chipset, with the chipset often embodied as a System-on-a-Chip (SoC) inclusive of one or more processing cores, memory devices, modems, transceivers, input/output circuitry, and other hardware components.

Aboard a modern motor vehicle and other mobile systems, a telematics unit having a resident communication SoC/chipset is used to interface with an in-vehicle controller area network (CAN) bus and one or more back-end cloud servers to provide internet access. When a compatible device is detected, e.g., via a BLUETOOTH connection, the telematics unit automatically pairs with the device. The telematics unit is thereafter able to control operation of the paired device, such as by transmitting or receiving incoming phone calls or text messages, accessing applications, or projecting/displaying content from the paired device via a display screen of an infotainment system, etc. Such "hands-free" functionality allows occupants of the motor vehicle to focus more closely on the roadway and the immediate driving task while facilitating voice-activated control of the paired device.

Modern Wi-Fi-enabled SoCs enjoy ever-increasing processing power and communication functionality. An example of chipset evolution is the dual-MAC chipset. Such a chipset contains two Wi-Fi cores supporting real-time simultaneous dual-band functionality. However, dual-MAC chipsets face certain performance limitations when used in the context of vehicle-based communication networks as set forth herein. The present teachings are therefore intended to address these and other challenges in order to take full advantage of the capabilities of dual-MAC chipsets in vehicular and other mobile applications.

SUMMARY

Disclosed herein are methods and systems for simultaneously connecting cores of a multi-core chipset to different external access points (APs), and for automatically assigning a station (STA) priority to support multiple use cases. Management of the various connections and operating modes using such a chipset is provided by the present method, which may be encoded as computer-readable instructions and accessed by the multi-core chipset to implement the present teachings.

While illustrative examples are provided herein in which the multi-core chipset is embodied as a commercially-available dual medium access controller ("dual-MAC") chipset used as an integral component of a vehicle telematics unit (VTU), those of ordinary skill in the art will appreciate that other mobile systems may benefit from the present teachings. The present disclosure is therefore not limited to vehicular applications in general or motor vehicle applications in particular. Likewise, teachings regarding dual-MAC chipsets may be extended to forward-looking chipset architectures possibly having more than two cores, e.g., tri-MAC chipsets. Therefore, descriptions pertaining to "dual-MAC" mean "communication chipsets having at least two cores" unless otherwise specified.

According to an exemplary embodiment set forth herein, a method for use aboard a mobile system having a multi-core wireless communication chipset operating in multiple frequency bands includes scanning a radio frequency spectrum to thereby identify candidate APs operating in one of the frequency bands of the chipset. The method includes selecting one of the candidate APs as a first AP for connection to a primary station of the chipset. In response to a secondary station of the chipset being connected to an external AP on a same one of the frequency bands as the first AP, the method includes automatically disconnecting the external AP from the secondary station, then connecting the first AP to the primary station after disconnecting the external AP from the secondary station. In this embodiment, another one of the candidate APs is then connected to the secondary station as a second AP, with simultaneous communication with the first AP and the second AP thereafter occurring via the primary station and the secondary station, respectively.

The multi-core communication chipset may be embodied as a dual-MAC chipset having two different frequency bands as the multiple frequency bands, e.g., 2.4 GHz and 5 GHz.

The mobile system may be a motor vehicle, in which case the multi-core chipset is a component of a vehicle telematics unit of the motor vehicle. The first AP in such an embodiment may be a mobile cellular device.

In some embodiments of the method, scanning the radio frequency spectrum includes automatically generating a list of the candidate APs in a memory register. Selecting one of the candidate APs as the first AP may include selecting the first AP from the list via the communication chipset using predetermined criteria. Communication with the first AP may optionally include a telephony and/or messaging operation of the first AP, or a navigation and/or infotainment operation aboard the mobile system. Communication with the second AP may include selectively downloading software and/or firmware updates to the mobile system from the second AP through the second station.

A telematics unit is also disclosed for use aboard a mobile system. In a representative embodiment, the telematics unit includes a multi-core communication chipset operating on a plurality of different frequency bands, and at least one processor. The processor is configured to scan a radio frequency spectrum to thereby identify candidate APs operating in one of the different frequency bands of the communication chipset, and select one of the candidate APs as a first AP for connection to a primary station of the communication chipset.

In response to a secondary station of the communication chipset being connected to an external AP on a same one of the different frequency bands as the first AP, the processor automatically disconnects the external AP from the secondary station and then connects the first AP to the primary station. Thereafter, the processor connects another one of the candidate APs to the secondary station as a second AP, and then simultaneously communicates with the first AP and the second AP via the primary station and the secondary station, respectively.

A motor vehicle includes road wheels coupled to a vehicle body, and a vehicle telematics unit (VTU) connected to the vehicle body for use aboard the motor vehicle. The VTU has a dual-MAC communication chipset operating separate 2.4 GHz and 5 GHz frequency bands, and at least one processor.

The processor is configured to scan a radio frequency spectrum to thereby identify candidate APs operating in the 2.4 GHz frequency band and/or the 5 GHz frequency band, and to select one of the candidate APs, as a first AP, for connection to a primary station of the communication chipset.

In response to a secondary station of the communication chipset being connected to an external AP on a same one of the 2.4 GHz frequency band or the 5 GHz frequency band as the first AP, the processor automatically disconnects the external AP from the secondary station, connects the first AP to the primary station, and then connects another one of the candidate APs to the secondary station as a second AP. Thereafter, the processor simultaneously communicates with the first AP and the second AP via the primary station and the secondary station, respectively.

The above-noted and other features and advantages of the present disclosure will be readily apparent from the following detailed description of the embodiments and best modes for carrying out the disclosure when taken in connection with the accompanying drawings and appended claims.

BRIEF DESCRIPTION OF THE DRAWINGS

FIG. 1 is a schematic illustration of a representative wireless network configured to operate in accordance with the present method.

FIG. 2 is a schematic illustration of a vehicle telematics unit (VTU) having a multi-core communication chipset and configured to implement a method as set forth herein.

Figure 3:
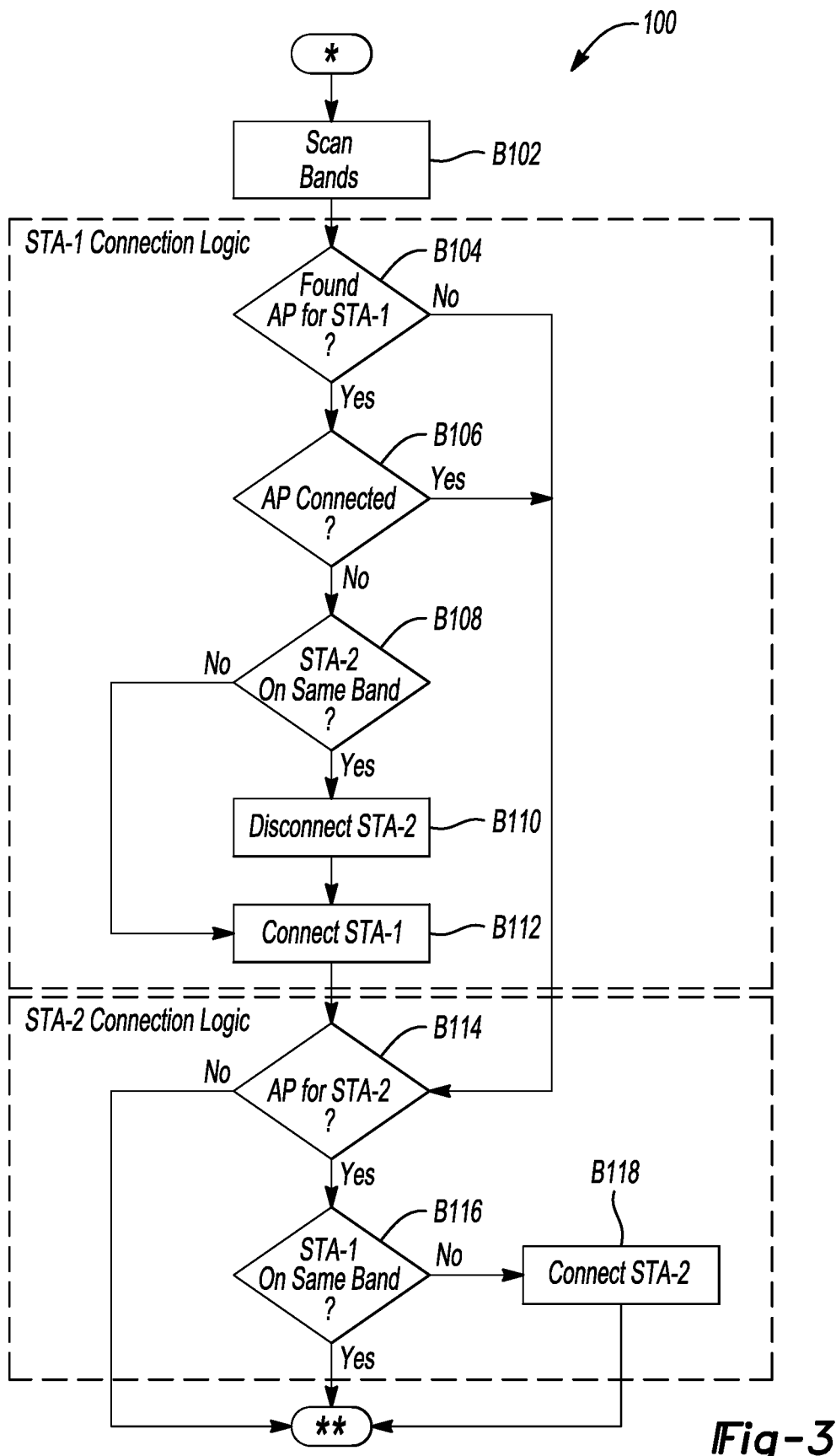
FIG. 3 is a flow chart describing an embodiment of a method for connecting the multi-core communication chipset of FIG. 2 to multiple external access points (APs) in a prioritized manner in accordance with the disclosure.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover modifications, equivalents, combinations, and alternatives falling within the scope and spirit of the disclosure as defined by the appended claims.

DETAILED DESCRIPTION

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

Referring to the drawings, wherein like reference numbers refer to like components, a communication system 10 as depicted schematically in FIG. 1 includes a vehicle 12 having road wheels 22 coupled to a vehicle body 13 in rolling contact with a road surface 24. The vehicle 12 also includes a resident vehicle telematics unit (VTU) 14 configured as set forth herein, with an exemplary embodiment of the VTU 14 shown in FIG. 2. The VTU 14 includes a multi-core communication chipset 20 which, via execution of instructions embodying a method 100 as described below with reference to FIG. 3, is able to simultaneously connect in primary and secondary station modes to external access points (APs), shown in FIG. 1 as a first AP (AP-1) and a second AP (AP-2), with such modes or "use cases" enabled using primary and secondary station logic.

As will be appreciated by those of ordinary skill in the art, current onboard wireless network solutions support single-station operation, and thus do not account for the use cases treated herein. The present teachings enable concurrent access to a partnered network at a lower priority via one access point, e.g., second access point AP-2, connected to a secondary station (STA-2) of the communication chipset 20 while maintaining priority connection to another access point (AP-1) on the primary station (STA-1). Among other attendant benefits of the present method 100, OEM manufacturers of the vehicle 12 or another mobile system using a similarly equipped VTU 14 may utilize the background "partnered network" connection of the secondary station to offload computational load.

For example, operation of the vehicle 12 of FIG. 1 requires, at times, the transfer of potentially large data files to or from the VTU 14. Data files may be in the form of software or firmware updates, operating system updates, and reports/updates respectively from/to various onboard controllers including but not limited to engine, motor, transmission, and/or hybrid control units (not shown). Likewise, such data files may encompass navigation software and/or other infotainment system software, which at times may be on the order of several gigabytes or more. Use of a user's cellular device 32 or other customer "bring-your-own device" (BYOD) or home hotspot on a primary station (STA-1) for such a purpose may be less than ideal, e.g., by requiring consumption of the cell minutes or bandwidth of the cellular device 32. Operation of the method 100, which is seamless to occupants of the vehicle 12, may thus make situational use of available Wi-Fi hotspots or other APs become available to offload computational load from a core used as the primary station (STA-1) to the otherwise unutilized or underutilized core, with primary and secondary cores labeled 20-P and 20-S for clarity. Those of ordinary skill in the art will appreciate that the labels "P" and "S" refer to functions of a given core during a given connection instance, as opposed to a particular connection frequency. That is, a core 20-P functioning in primary station (STA-1) mode may be a 2.4 GHz core or a 5 GHz core in a representative dual-MAC embodiment, with the core 20-S, when connected, operating in the other frequency band, i.e., 5 GHz when core 20-P operates at 2.4 GHz, or vice versa.

Referring briefly to FIG. 2, a network communication bus is operatively coupled to the VTU 14. Examples of suitable network connections bus include a controller area network (CAN) bus as shown, or alternatively a media-oriented system transfer connection, a local interconnection network connection, an Ethernet connection, or other application-suitable connections. The VTU 14 of FIG. 2 may be configured as an onboard device that provides a variety of services through its communication with a remote/background server (not shown) over the internet 11 of FIG. 1, and generally includes the above-noted multi-core communication chipset 20, inclusive of or coupled to memory (M) 16, one or more processors (P) 18, antennas (Tx) 25A and 25B, and possibly other components such as navigation units containing a GPS chipset (not shown). The memory 16 may include computer-readable storage devices/media, i.e., memory 16. The memory 16 may include volatile and non-volatile storage in read-only memory (ROM), randomaccess memory (RAM), keep-alive memory (KAM), flash memory, and/or other suitable electric, magnetic, or optical memory or combinations thereof. Other components not depicted but considered part of the VTU 14 or coupled thereto include a microphone, speaker, buttons and/or controls, etc.

The VTU 14 of FIG. 2 is configured to enable voice and/or data communication over one or more wireless network connections 35 and 45, thereby allowing communication to occur over the internet 11 and/or with other networked vehicles or systems using the above-noted multi-core communication chipset 20, e.g., a dual-MAC chipset or SoC as described below. Long-range vehicle communication with remote or off-board networked devices is provided via the multi-core chipset 20. Within the vehicle 12 of FIG. 1, for instance, close-range wireless connectivity may be provided via a suitable short-range connection, e.g., BLUETOOTH® or near-field communication (NFC), a dedicated short-range communication (DSRC) component, etc. The various communication devices described herein may be optionally configured to exchange data as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), and/or Vehicle-to-Device (V2D).

Instructions embodying the present method 100, a representative embodiment of which is described below with reference to FIG. 3, may include one or more separate programs. Each program may include an ordered listing of executable instructions for implementing logical functions. The overall architecture, setup, and operation of the VTU 14 as well as the individual components of the illustrated communication system 10 of FIG. 1 are merely exemplary, and differently configured communication systems 10 may also be utilized to implement the examples of the method 100 disclosed herein. Thus, the following paragraphs, which provide a brief overview of the functions of the illustrated communication system 10, are not intended to be limiting.

Referring once again to FIG. 1, within the scope of the present disclosure, execution of the method 100 allows the multi-core communication chipset 20 to connect to multiple external APs in primary and/or secondary station modes (STA-1 and/or STA-2, respectively) using the flow and prioritization process of FIG. 3. In a simplified dual-MAC embodiment of the multi-core communication chipset 20, for instance, the cellular device 32 may be used as a first access point (AP-1). The cellular device 32 is paired with the multi-core communication chipset 20 of the VTU 14 over a wireless network connection 34. Connection with one channel of the multi-core communication chipset 20, which may occur over a transceiver 25A, thus establishes the STA-1 connection mode between the VTU 14 and the cellular device 32, i.e., AP-1.

Likewise, in the same dual-MAC embodiment of the multi-core communication chipset 20, the vehicle 12 of FIG. 1 may encounter a second access point (AP-2), such as a hotspot 42 or partnered network as set forth below. The multi-core communication chipset 20 selectively connects to the hotspot 42 as AP-2, which occurs over another wireless network connection 44. Connection with the other channel of the multi-core communication chipset 20 may occur over a transceiver 25B to establish the secondary station 20-S mode in this simplified embodiment. Therefore, the dual-MAC chipset 20 situationally acts as two stations, i.e., STA-1 and STA-2, when respectively connected to two external APs, i.e., AP-1 and AP-2. Prioritization and coordination of such station and access point connections is therefore the purview of method 100, an embodiment of which will now be described with reference to FIG. 3.

Referring to FIG. 3, in general the method 100 operates as follows: after first scanning the full radio frequency spectrum for available candidate access points (APs) and generating a list thereof, e.g., in a memory register, the VTU 14 determines if an AP on the list is usable for connection to a primary station (STA-1) or core of the communication chipset 20. Such a determination may be made automatically using suitable decision criteria, for instance signal strength, identity of the AP, etc. The VTU 14 then determines whether an external AP is already connected to the secondary station (STA-2) in the same frequency band as the device slated for connection to the primary station (STA-1). If so, the external AP is automatically disconnected from the secondary station (STA-2) before connecting the candidate AP to the primary station (STA-1). Secondary station connection logic is executed once primary station connection logic is complete, with an available second AP connected to the secondary station (STA-2) if not already on the same frequency band as the primary station (STA-1).

Thus, in a dual-MAC example in which the possible frequency bands for STA-1 and STA-2 are 2.4 GHz and 5 GHz, with the two stations or cores not being able to operate simultaneously on the same frequency band, assuming a candidate AP operating at 5 GHz or 2.4 GHz is detected during the scan and an external AP is already connected to the secondary station (STA-2) at the same 5 GHz or 2.4 GHz frequency, the secondary station is disconnected.

The method 100 may initiate (*) with a key-on event of the vehicle 12 shown in FIG. 1, or in response to another suitable signal indicative of the VTU 14 being powered on and ready to pair with one or more external devices. The method 100 then proceeds to block B102.

At block B102, the multi-core communication chipset 20 scans the full radio spectrum for candidate APs that might be available for wireless connection, with "candidate" meaning available APs suitable for connection, e.g., terms of signal strength, proximity, predetermined preference, priority, etc. In a simplified dual-MAC embodiment of the multi-core communication chipset 20, for example, the multi-core communication chipset 20 operates in two frequency bands, typically the 2 GHz and 5 GHz frequency bands. However, as cellular technology and SoC capabilities evolve, future embodiments may encompass three cores in a single SoC or chipset, and thus at least a third frequency band, e.g., 6 GHz or 8 GHz. Thus, two frequencies are exemplary of the present teachings and not limiting thereof. The output of block B102 is a list in memory (M) of available APs and the corresponding frequency band of each. The method 100 proceeds to block B104 upon generation of such a list.

Primary Station (STA-1) Connection Logic: as noted above, blocks B104-B112 of the method 100 encompass primary station (STA-1) connection logic. Beginning with block B104, the multi-core communication chipset 20 determines whether a candidate AP located at block B102 is suitable for connection to the primary station, i.e., STA-1, which is one of the cores of the multi-core communication chipset 20. In the FIG. 1 embodiment in which the user's cellular phone 32 (FIG. 1) is used as a mobile hotspot, for example, the cellular phone 32 typically connects in primary station (STA-1) mode operating at either 2.4 GHz or 5 GHz. If an AP is detected at block B104 and is suitable for the primary station (STA-1) based on predetermined or ad-hoc priority criteria, the method 100 proceeds to block B106, with the method 100 otherwise proceeding to block B114.

At block B106, the method 100 determines whether the multi-core communication chipset 20 of the VTU 14 is connected to the AP that was detected at block B104. If so, the method 100 proceeds to block B114. The method 100 proceeds in the alternative to block B108 when the multi-core communication chipset 20 is not connected to the AP previously detected at block B104.

Block B108 entails determining if the secondary station (STA-2), i.e., the other core in the dual-MAC chipset embodiment, is connected to an external AP on the same frequency band as the detected AP tentatively scheduled for connection to the primary station (STA-1). The method 100 proceeds to block B110 when this is the case, and to block B112 when the secondary station (STA-2) is not connected on the same frequency band.

At block B110, the VTU 14 disconnects the external AP connected to the particular core acting in secondary station (STA-2) mode, and then proceeds to block B112.

At block B112, the multi-core communication chipset 20 is automatically connected to the first AP in primary station (STA-1) mode. In the example use case noted above, i.e., when the cellular phone 32 of FIG. 1 is connected as a first AP to the particular core acting as the primary station (STA-1), the cellular phone 32 remains connected in a "hands-free" mode of operation throughout a drive cycle of the vehicle 12. Thus, data flow for general operation of the VTU 14 proceeds through the network connection 34 (FIG. 1) established between the multi-core communication chipset 20 and a resident mobile chipset (not shown) of the cellular phone 32. The method 100 then proceeds to block B114.

Secondary Station (STA-2) Connection Logic: commencing with block B114 of FIG. 3, the method 100 next includes determining whether an external AP was located at block B102 that is suitable for connection to secondary station (STA-2). As will be appreciated by those of ordinary skill in the art, an external AP in the form of a stationary or mobile hotspot, such as might be hosted by a restaurant, coffee shop, retailer, airport, another cell phone acting as a mobile hotspot, or another available networked AP may present itself as available for connection based on the present location of the VTU 14.

In a vehicular or other mobile application, the list of candidate APs possibly suitable for connection to the core acting as the secondary station (STA-2) within the multi-core communication chipset 20 will dynamically change, e.g., as the vehicle 12 travels between an origin and a destination. The method 100 proceeds to block B116 when the multi-core communication chipset 20 determines that an AP has been detected for connection to the secondary station (STA-2). The method 100 is otherwise finished (**), resuming anew with block B102 such that the method 100 continuously runs in a loop and updates with changing information.

At block B116, the method 100 includes determining if the first AP connected to the primary station (STA-1) operates on the same frequency band as the AP detected for possible connection to the secondary station (STA-2). If so, the AP detected for possible connection to the secondary station (STA-2) is not connected. The method 100 is finished (**), resuming as noted above with block B102, with other possible algorithms not described herein possibly searching through other alternative candidate APs for connection to the secondary station (STA-2). However, the method 100 proceeds to block B118 when the primary station (STA-1) is not connected to the same frequency band as the candidate AP.

Block B118 includes connecting the secondary station (STA-2) to the candidate AP detected at block B102, as verified at block B114. Thereafter, the AP on the secondary station (STA-2) remains connected for as long as the VTU 14 remains coupled to the AP.

An example scenario is illustrative of the present teachings. A driver of the vehicle 12 shown in FIG. 1 may enter the vehicle 12, whereupon the driver's cellular phone 32 is detected and automatically coupled to the VTU 14, e.g., using a BLUETOOTH connection. The multi-core communication chipset 20 of the paired VTU 14 then scans the frequency spectrum for available APs to connect to primary and secondary stations (STA-1 and STA-2) of the multi-core communication chipset 20, with the method 100 proceeding first according to the STA-1 connection logic (blocks B104-B112) before continuing with the STA-2 connection logic (blocks B114-B118).

Access to the internet 11 in this particular instance thus over the network connection 34 via the primary station (STA-1) connection indicated at 20-P in FIG. 1. This connection is generally static for the course of a typical drive cycle, assuming connectivity to the internet 11 is not lost for other reasons such as weather, power outages, interference, network traffic, etc. However, the connection does not need to be static, e.g., the primary station (STA-1) could connect to a home hotspot after a drive cycle upon arriving home. If progression of method 100 of FIG. 3 permits it, another AP will be located and connected to the secondary station (STA-2) using the STA-2 connection logic set forth above. However, the identity of the AP connected to the secondary station (STA-2) will likely change dynamically with the location of the vehicle 12, and thus the method 100 may continue to execute in a loop as the VTU 14 scans for and evaluates detected APs for corresponding frequency bands and possible conflict with connections on the primary station (STA-1).

Traditionally, dual-MAC chipsets such as the multi-core communication chipset 20 operate as an AP on both frequency bands while at the same time being connected to an external AP as a station, on either a resident 2.4 GHz core or a resident 5 GHz core. Such an "AP+AP+STA" arrangement is thus transformed herein into a dual-station arrangement, "STA+STA+AP+AP", with primary and secondary connection logic progressing as depicted in FIG. 3.

As alluded to above, the present teachings provide a range of possible benefits, most notably by allowing for concurrent background partnered network access. This provides the ability to selectively offload communication functions to the secondary station (STA-2) when such an opportunity presents itself, which in turn may lead to improved user satisfaction. Data updates, for instance, could proceed sporadically or intermittently as various candidate APs come and go over a given drive cycle, such as by downloading a portion of a large software and/or firmware update while the vehicle 12 remains stationary at an intersection or parking lot proximate a mobile hotspot, and then pausing the download operation as the vehicle 12 moves away from the hotspot. When a new candidate AP is detected for connection to STA-2, the VTU 14 may connect the new AP according to the prioritization scheme provided by method 100. This and other potential benefits will be readily appreciated by those of ordinary skill in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for use aboard a mobile system having a multi-core wireless communication chipset operating in multiple frequency bands, the method comprising:
   scanning a radio frequency spectrum via a processor of the chipset to thereby identify candidate access points (APs) operating in one of the different frequency bands of the chipset;
   selecting one of the candidate APs as a first AP for connection to a primary station of the chipset;
   in response to a secondary station of the chipset being connected to an external AP on a same one of the different frequency bands as the first AP, automatically disconnecting the external AP from the secondary station via the processor;
   connecting the first AP to the primary station after disconnecting the external AP from the secondary station;
   connecting another one of the candidate APs to the secondary station as a second AP; and
   simultaneously communicating with the first AP and the second AP via the primary station and the secondary station, respectively.

2. The method of claim 1, wherein the chipset is a dual-MAC chipset having two different frequency bands as the different frequency bands.

3. The method of claim 2, wherein the two different frequency bands are 2.4 GHz and 5 GHz.

4. The method of claim 1, wherein the mobile system is a motor vehicle, and wherein the chipset is a component of a vehicle telematics unit of the motor vehicle.

5. The method of claim 4, wherein the first AP is a mobile cellular device.

6. The method of claim 1, wherein scanning the radio frequency spectrum includes automatically generating a list of the candidate APs in a memory register accessible by the processor, and wherein selecting one of the candidate APs as the first AP includes selecting the first AP from the list via the chipset using predetermined criteria.

7. The method of claim 1, wherein simultaneously communicating with the first AP and the second AP includes controlling a telephony and/or messaging operation of the first AP.

8. The method of claim 1, simultaneously communicating with the first AP and the second AP includes performing a navigation and/or infotainment operation aboard the mobile system using the first AP.

9. The method of claim 1, wherein s simultaneously communicating with the first AP and the second AP includes selectively downloading software and/or firmware updates to the mobile system from the second AP using the second station.

10. A telematics unit for use aboard a mobile system, the telematics unit comprising:
    a multi-core communication chipset operating on a plurality of different frequency bands; and
    at least one processor configured to:
    scan a radio frequency spectrum to thereby identify candidate access points (APs) operating in one of the different frequency bands of the chipset;
    select one of the candidate APs, as a first AP, for connection to a primary station of the chipset;
    in response to a secondary station of the chipset being connected to an external AP on a same one of the different frequency bands as the first AP, automatically disconnecting the external AP from the secondary station;
    connect the first AP to the primary station after disconnecting the external AP from the secondary station;
    connect another one of the candidate APs to the secondary station as a second AP; and
    simultaneously communicate with the first AP and the second AP via the primary station and the secondary station, respectively.

11. The telematics unit of claim 10, wherein the chipset is a dual-MAC chipset operating in a first frequency band of 2.4 GHz and a second frequency band of 5 GHz, and wherein the different frequency bands include 2.4 GHz and 5 GHz.

12. The telematics unit of claim 11, wherein the mobile system is a motor vehicle, and the telematics unit operating at 2.4 GHz and 5 GHz is a vehicle telematics unit of the motor vehicle.

13. The telematics unit of claim 12, wherein the first AP is a mobile cellular device located within the motor vehicle.

14. The telematics unit of claim 10, wherein the at least one process is configured to generate a list of the candidate APs in a memory register, and to automatically select the first AP and the second AP from the list.

15. The telematics unit of claim 10, wherein the at least one processor is configured to simultaneously communicate with the first AP by performing a telephony and/or messaging operation via the first AP using the primary station while communicating with the second AP via the secondary station.

16. The telematics unit of claim 10, wherein the at least one processor is configured to simultaneously communicate with the first AP by performing a navigation and/or infotainment operation via the first AP using the primary station while communicating with the second AP via the secondary station.

17. The telematics unit of claim 10, wherein the at least one processor is configured to simultaneously communicate with the second AP by selectively downloading software and/or firmware updates to the mobile system via the second AP using the secondary station.

18. A motor vehicle comprising:
    a vehicle body;
    road wheels coupled to the vehicle body; and
    a vehicle telematics unit (VTU) connected to the vehicle body for use aboard the motor vehicle, the VTU having a multi-core communication chipset operating on a plurality of different frequency bands, and at least one processor configured to:
    scan a radio frequency spectrum to thereby identify candidate access points (APs) operating in one of the 2 different frequency bands of the chipset;
    select one of the candidate APs, as a first AP, for connection to a primary station of the chipset;
    in response to a secondary station of the chipset being connected to an external AP on a same one of the different frequency bands as the first AP, automatically disconnecting the external AP from the secondary station;
    connect the first AP to the primary station after disconnecting the external AP from the secondary station;
    connect another one of the candidate APs to the secondary station as a second AP; and simultaneously communicate with the first AP and the second AP via the primary station and the secondary station, respectively.

19. The motor vehicle of claim 18, wherein the first AP is a mobile cellular device located within the motor vehicle, and the at least one processor is configured to perform a telephony operation, a messaging operation, a navigation operation, and/or an infotainment operation using the first AP via the primary station.

20. The motor vehicle of claim 19, wherein the at least one processor is configured to selectively download software and/or firmware updates to the mobile system using the second AP via the secondary station.

* * * * *